United States Patent [19]

Powell, II et al.

[11] Patent Number: 5,687,197

[45] Date of Patent: Nov. 11, 1997

[54] METHOD AND APPARATUS FOR DETECTING DATA SYMBOLS IN A DIVERSITY COMMUNICATION SYSTEM

[75] Inventors: Clinton C. Powell, II, Lake Worth; James Michael Keba, Wellington; Stephen Rocco Carsello, Boynton Beach; Eric Thomas Eaton, Lake Worth, all of Fla.

[73] Assignee: Motorola, Inc., Schaumburg, Ill.

[21] Appl. No.: 499,261

[22] Filed: Jul. 7, 1995

[51] Int. Cl.$^6$ ........................................ H04B 7/10
[52] U.S. Cl. .................. 375/347; 375/349; 455/133; 455/134; 455/135; 455/277.1
[58] Field of Search ...................... 375/347, 349; 455/133, 134, 135, 277.1, 277.2

[56] References Cited

U.S. PATENT DOCUMENTS

| | | | |
|---|---|---|---|
| 4,028,627 | 12/1975 | Cho et al. | 455/135 |
| 4,064,033 | 12/1975 | Harbert et al. | 455/135 |
| 5,109,392 | 5/1989 | McDonald | 375/347 |
| 5,164,964 | 3/1991 | Kubo | 455/135 |
| 5,291,519 | 2/1992 | Tsurumaru | 375/347 |
| 5,325,403 | 12/1992 | Siwiak et al. | 455/134 |
| 5,541,963 | 11/1994 | Nakagoshi | 375/347 |

*Primary Examiner*—Wellington Chin
*Assistant Examiner*—Conguan Tran
*Attorney, Agent, or Firm*—James A. Lamb

[57] ABSTRACT

A data receiver (110) for processing multiple signals includes a receiving circuit (120) for demodulating at least first and second signals and a selector (125) coupled to the receiving circuit (120) for comparing the at least first and second signals to estimated peak and valley values. The selector (125) generates error values associated with the at least first and second signals and selects a data symbol associated with one of the estimated peak and valley values based on the error values. A timing circuit (140, 150) activates the selector (125) at predetermined times, and a controller (140) coupled to the selector (125) and the timing circuit (140, 150) recovers information in accordance with the data symbol and other data symbols.

13 Claims, 14 Drawing Sheets

METHOD AND APPARATUS FOR DETECTING DATA SYMBOLS IN A DIVERSITY COMMUNICATION SYSTEM

FIELD OF THE INVENTION

This invention relates in general to diversity communication systems, and more specifically to detecting data symbols in such systems.

BACKGROUND OF THE INVENTION

Conventional communication systems, such as paging systems, include a transmitter for providing radio signals over at least one radio channel and receivers for receiving the radio signals. When the radio channel is static, i.e., when there is a direct communication path from the transmitter to the receiver, the received signal is corrupted only by noise. However, in many situations, such as in most paging systems, the radio signal is transmitted over a fading channel, in which case the signal can arrive at the receiver over many different paths. The signal paths are typically delayed, resulting in received signals that are out of phase. Additionally, when the receiver is moving, such as when the subscriber is traveling in a car, signals can be received when the receiver is located in a "null", i.e., a location in which there is decreased signal strength. The reception of the delayed signals can cause erroneous recovery of information or even missed pages, such as when the signals arrive 180° out of phase or when a traveling receiver is located in a null in which the signal strength is too low for error-free decoding.

Diversity communication systems involve the use of space diversity or time diversity to increase the probability of correctly decoding received information. In spatial diversity, a receiver utilizes at least two antennas spaced a particular distance apart for receiving the signals. Therefore, when one antenna is located in a null, it is likely that the other will not be. In time diversity systems, the transmitter sends the information more than one time. The receiver then has more than one chance to receive a signal that can be correctly decoded.

In diversity systems, though, radio signals can still be erroneously decoded, such as when both antennas are located in nulls or when identical messages are both erroneously received. Therefore, an opportunity exists to increase the reliability of message decoding in diversity systems.

Thus, what is needed is a method and apparatus for more reliably detecting data symbols in a diversity communication system.

DESCRIPTION OF A PREFERRED EMBODIMENT

Figure 1:
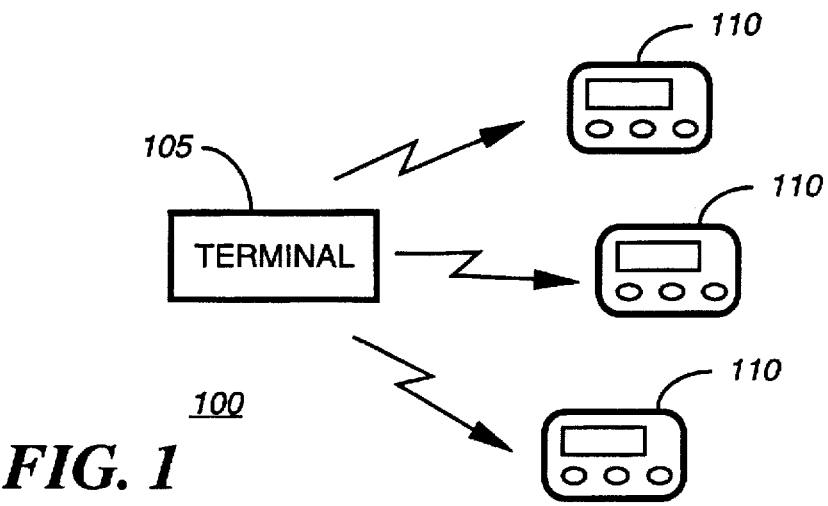
FIG. 1 is a communication system including a message transmission device and data communication receivers in accordance with the present invention.

FIG. 1 is an electrical block diagram of a communication system 100, such as a radio communication system, including a message transmission device, e.g., a paging terminal 105, and data communication receivers 110. The data communication receivers 110 can be, for instance, pagers or two-way radios.

Figure 2:
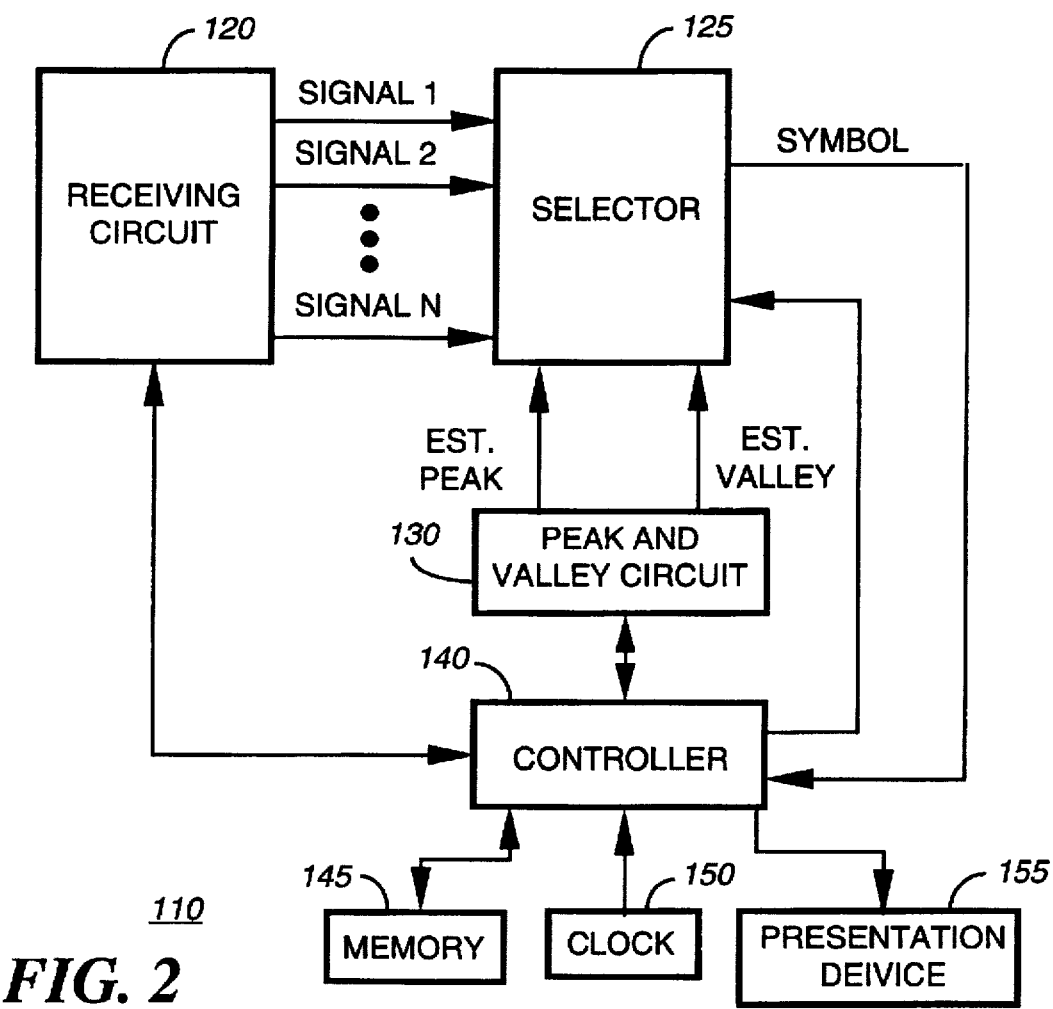
FIG. 2 is an electrical block diagram of a data communication receiver of FIG. 1 in accordance with the present invention.

FIG. 2 is an electrical block diagram of a data communication receiver 110 included in the communication system 100 according to the present invention. The data communication receiver 110 includes a receiving circuit 120 for receiving and demodulating communication signals. The demodulated signals are then provided to a selector 125, which samples the demodulated signals at predetermined times, such as at each symbol time, to produce a stream of data symbols. In a two level signalling system, for example, the selector 125 provides a stream of zeros and ones.

Further included in the data communication receiver 110 is a conventional peak and valley circuit 130 for generating an estimated peak value, i.e., high signal level, and an estimated valley value, i.e., low signal level, for use in processing the incoming signals. According to the present invention, the selector 125 processes the sampled signals, with reference to the estimated peak and valley, to determine which of predetermined symbols is to be provided, each symbol time, to a controller 140 for controlling the operation of the data communication receiver 110. The controller 140 processes the received symbols in a conventional manner to recover information intended for reception by the data communication receiver 110.

The peak and valley values can be estimated using conventional techniques. By way of example, the estimated peak and valley values can be set values determined prior to reception of the various data signals. Alternatively, the peak and valley values can be estimated from a signal selected for use by the selector 125.

In some instances, pulse shaping can be used. Pulse shaping could cause overshoots in the nominal signal levels. If the peak and valley algorithm tracks the peaks and valleys in the entire demodulated signal, the estimated peak and valley values can overshoot the true nominal symbol levels. It will be appreciated that a conventional adjustment of the derived peak and valley estimates will result in the proper symbol levels for use as the estimated peak and valley values.

The data communication receiver 110 also includes a memory 145 for storing received information and data necessary for operation of the data communication receiver 110. A clock 150 coupled to the controller 140 provides time values used to activate the selector 125 each symbol time, and a presentation device 155 coupled to the controller 140 presents information to a user of the data communication receiver 110. The presentation device 155 can be, for example, a liquid crystal display for presenting alphanumeric information or a speaker for presenting voice messages.

According to the present invention, the data communication receiver 110 is a diversity receiver. In other words, the data communication receiver 110 processes more than a single signal for information recovery so that the information can be recovered accurately. Preferably, the data communication receiver 110 receives at least two signals that contain duplicate information. Each symbol time, the data communication receiver 110 then selects a data symbol from one of the received signals by processing the signals in accordance with the present invention, as will be explained in detail below. Thereafter, the selected data symbols are combined by the controller 140 to recover information transmitted to the data communication receiver 110.

Signals transmitted by the terminal 105 (FIG. 1) reach the data communication receiver 110 by several paths, some of which are delayed. As the data communication receiver 110 moves, such as when being carried by a user, the data communication receiver 110 travels through "nulls" in which the signal level for a given path can be relatively low. When in a null, the data communication receiver 110 can receive a signal erroneously or miss the signal entirely. Therefore, two methods, i.e., spatial diversity and time diversity, are commonly utilized to increase the likelihood of accurate reception by the data communication receiver 110.

Figure 3:
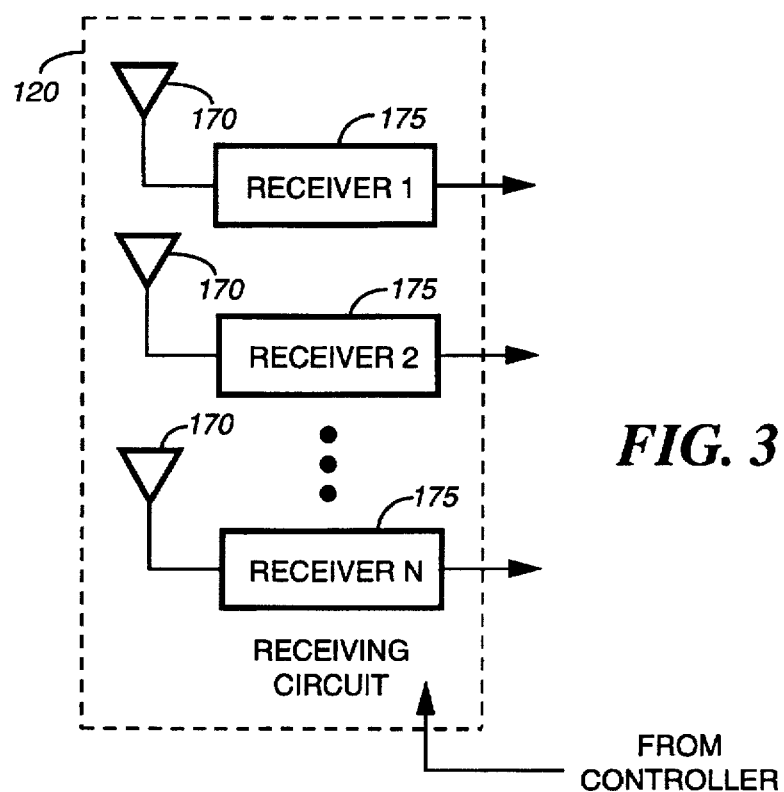
FIG. 3 is an electrical block diagram depicting a first embodiment of a receiving circuit included in the data communication receiver of FIG. 1 in accordance with the present invention.

Referring to FIG. 3, an electrical block diagram depicts a first embodiment of the receiving circuit 120 included in the data communication receiver 110 according to the present invention. In a spatial diversity system, the receiving circuit 120 preferably comprises a plurality of antennas 170 each spaced a predetermined distance from one another within the data communication receiver 110. The predetermined distance is calculated in a conventional manner based on the frequency of the transmitted signal. Each antenna 170 is coupled to a receiver 175 for demodulating the signal received by the antenna 170. In this manner, when one antenna is located in a null, it is probable that another antenna is located in an area of greater signal strength. The received signals are processed by the receivers 175 to provide at least two signals to the selector 125 (FIG. 2).

Figure 4:
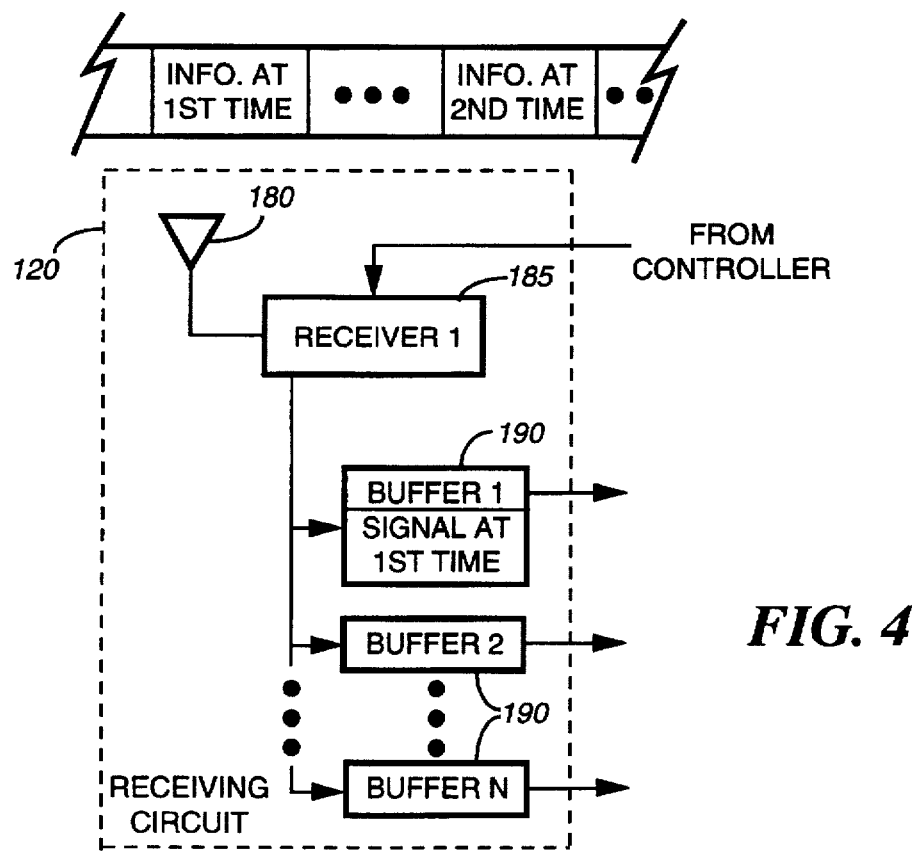
FIG. 4 is an electrical block diagram depicting second embodiment of a receiving circuit included in the data communication receiver of FIG. 1 in accordance with the present invention.

FIG. 4 is an electrical block diagram of a second embodiment of the receiving circuit 120. In a time diversity system, the terminal 105 transmits duplicate signals, including duplicate information, at various times. The antenna 180 receives the multiple signals for demodulation by the receiver 185 and storage in one or more buffers 190. The receiver 185 is activated for reception by the controller 140 at predetermined times when the duplicate information is transmitted by the terminal 105. Once all of the multiple signals have been received, the received signals are provided from the buffers 190 to the selector 125 for processing thereby. Alternatively, as each duplicate signal is received, the received duplicate signal along with a previous signal can be processed by the selector 125 such that only one signal at a time need be stored. Specifically, a first signal would be stored. When a second signal, e.g., the first duplicate signal, was received, the two signals would be processed by the selector 125 to yield only one selected signal. When another duplicate signal was thereafter received, the selected signal and the other duplicate signal would be provided to the selector 125, and so on.

Although only first and second embodiments of the receiving circuit 120 have been shown in FIGS. 3 and 4, it will be appreciated that any method for providing more than a single signal to the selector 125 can be utilized.

Figure 5:
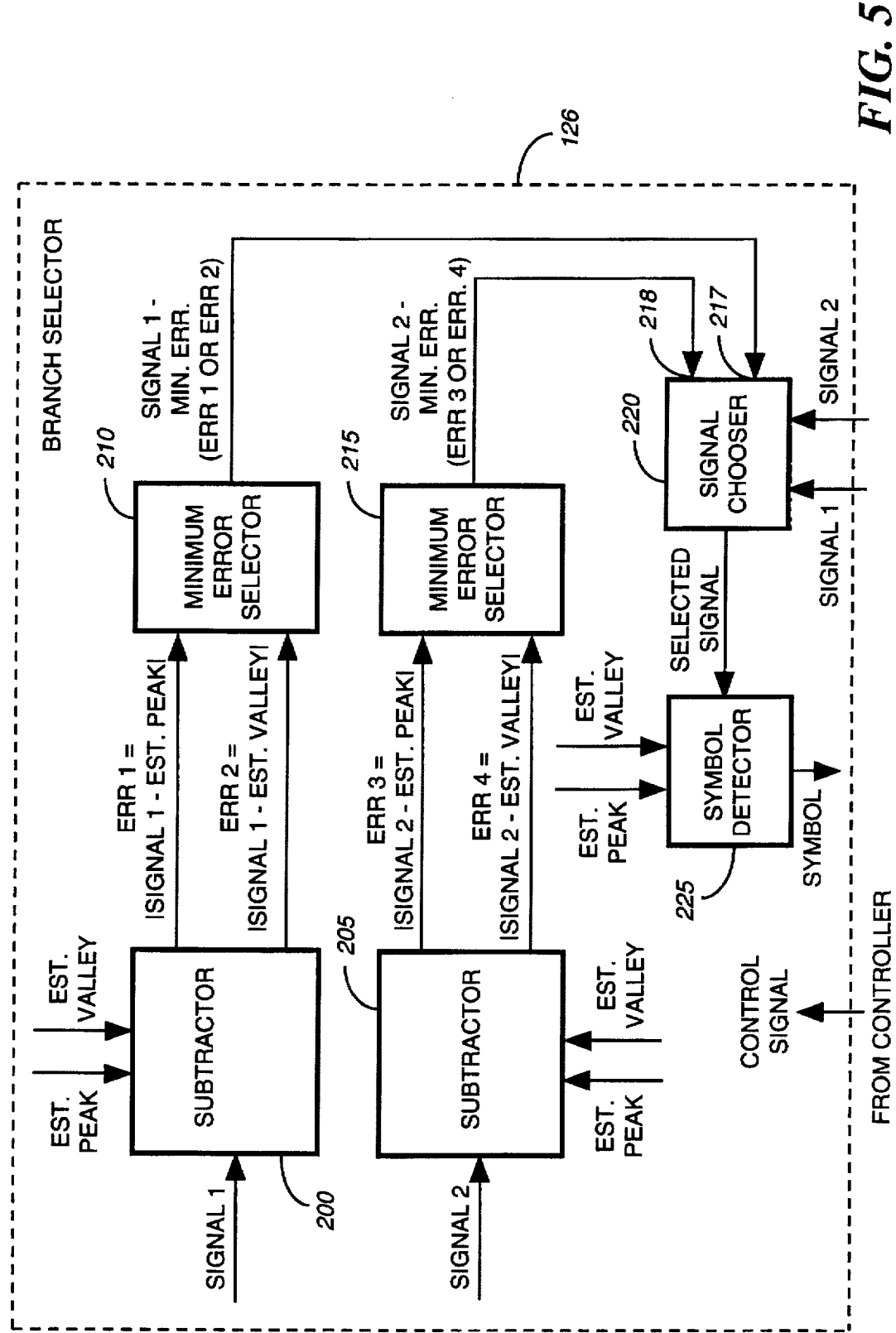
FIG. 5 is an electrical block diagram of a branch selector circuit for selecting symbols in the data communication receiver of FIG. 1 in accordance with the present invention.

Referring next to FIG. 5, an electrical block diagram depicts a branch selector 126 which can be utilized to implement the selector 125 (FIG. 2). According to the present invention, the branch selector 126 comprises a first subtractor 200 for receiving, when activated by the controller 140, a first signal from the receiving circuit 120 and the estimated peak and valley from the peak and valley circuit 130. The subtractor 200 subtracts the estimated peak from the signal and then the estimated valley from the signal to generate two absolute values associated with two error values, err1 and err2, given by the following formulas:

$$err1 = |signal1 - estimated\ peak| \quad (1)$$

$$err2 = |signal1 - estimated\ valley|. \quad (2)$$

The branch selector 126 also includes a second subtractor 205 for receiving a second signal from the receiving circuit 120. The second subtractor 205 provides error values err3 and err4 given by the following formulas:

$$err3 = |signal2 - estimated\ peak| \quad (1)$$

$$err4 = |signal2 - estimated\ valley|. \quad (2)$$

A minimum error selector 210 is coupled to the first subtractor 200 for receiving the error values err1 and err2. Additionally, a minimum error selector 215 is coupled to the second subtractor 205 for receiving the error values err3 and err4. Each minimum error selector 210, 215 selects the minimum of the two error values provided thereto and provides the minimum error value min.err to a signal chooser 220. According to the present invention, the signal chooser 220 is able to determine which minimum error value is associated with each incoming signal. For instance, the minimum error value associated with the first signal can be received on a first predetermined input port 217, and the minimum error value associated with the second signal can be received on a second predetermined input port 218. The signal chooser 220 also receives the first and second signals. After determining which of the two received minimum error values is smaller, the signal chooser 220 preferably functions as a switch between the incoming signals based upon the smaller of the received error values. For instance, when the minimum error value for the first signal is the smaller of the received minimum error values, the signal chooser 220 provides the first signal at its output, and vice versa.

The branch selector 126 further includes a symbol detector 225 coupled to the signal chooser 220 for receiving the signal selected by the signal chooser 220. The estimated peak and valley values are also provided to the symbol detector 225 from the peak and valley circuit 130 (FIG. 2). The symbol detector 225 determines, in a conventional manner, whether the selected signal is closer in value to the estimated peak or to the estimated valley. In a two level system, when the signal is closer to the estimated peak, the symbol detector 225 generates a data symbol corresponding to a one (1). When, conversely, the signal is closer to the estimated valley, the symbol detector 225 generates a data symbol corresponding to a zero (0).

In a four level system, for example, each subtractor 200, 205 would generate four error values, each associated with one of four data ranges. The minimum error selector 210, 215 would then process the four error values to out-put a minimum error to the signal chooser 220. Thereafter, the symbol detector 225 would generate, from the estimated peak and valley values, the four data ranges corresponding to four different data symbols. One of four data symbols would be generated based upon the range within which the received signal was located.

It will be appreciated that reception of only two signals is shown for illustration purposes only. When n signals are received by the receiving circuit 120 and provided to the branch selector 126, n subtractors are included, in which case each of the n subtractors would be coupled to a single incoming signal and would output two error signals computed with reference to the estimated peak and valley. Additionally, n minimum error selectors would select minimum error values for transmission to the signal chooser 220, which would, for example, include n dedicated ports for reception of the minimum error values.

The subtractors 200, 205, minimum error selectors 210, 215, signal chooser 220, and symbol detector 225 are preferably implemented in software, such as in a digital signal processor (not shown). Alternatively, hardware capable of performing equivalent operations could be utilized.

The branch selector 126 is activated by the controller 140 each symbol time so that, each symbol time, a data symbol is generated and provided to the controller 140. According to the present invention, the data symbol is generated from the one of several received signals that is determined to be the least erroneous during that symbol time. Because the symbol can be generated from a different signal each symbol time, the symbols provided to the controller 140 can be generated more accurately than when only a single signal is utilized for generation of all of the symbols.

Conventionally, diversity data receivers receive more than one signal and determine the received signal strength of each signal. The signal from which a data symbol is generated is then chosen upon its strength. In the data communication receiver 110 according to the present invention, on the other hand, error values are generated from the received signals and the expected data ranges of data symbols. There is no need to determined signal strength of received signals, so data symbol selection can be performed at the receiver back end. Therefore, the data symbol selection can be performed digitally in a relatively simple process.

Figure 6:
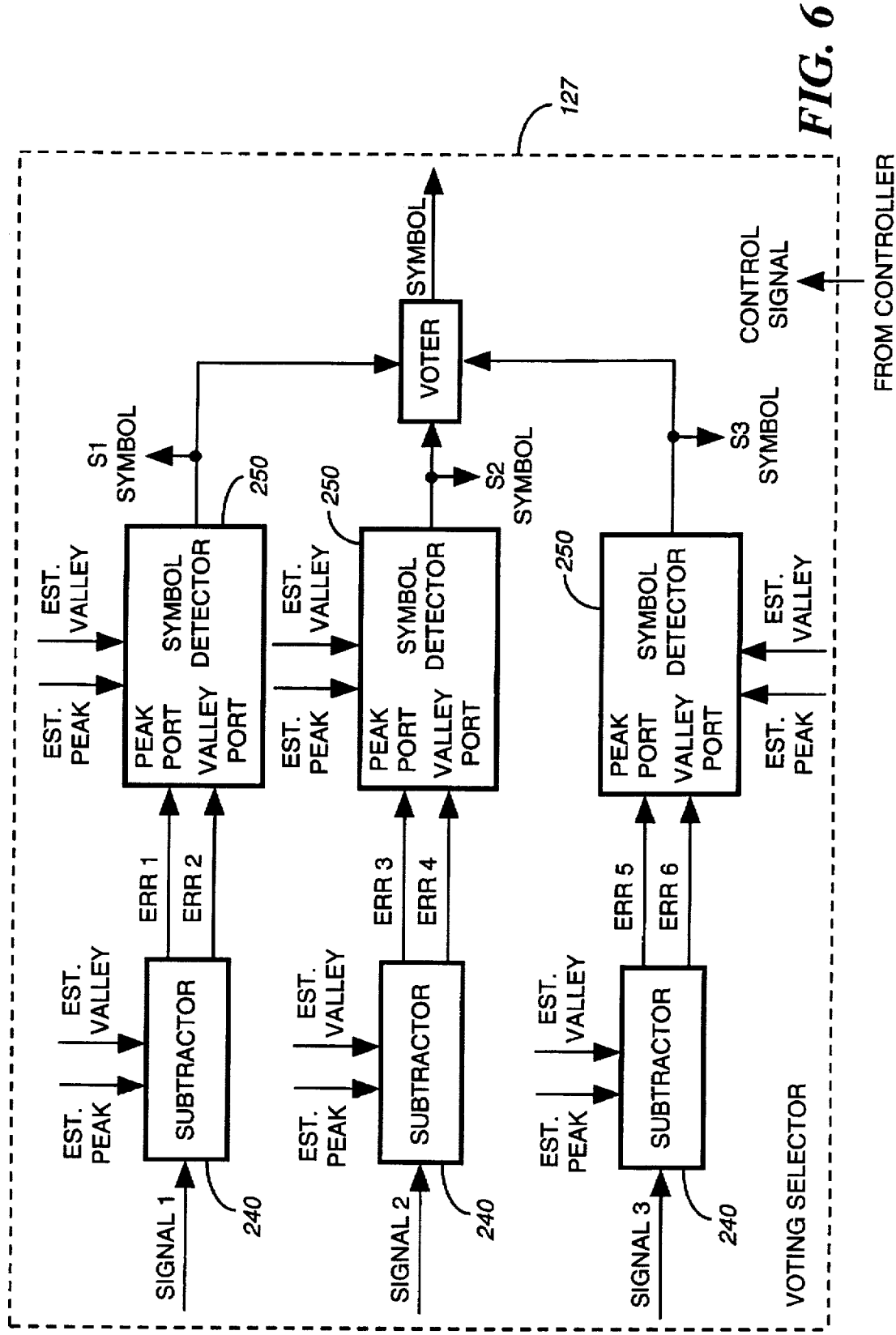
FIG. 6 is an electrical block diagram of a voting selector circuit for selecting symbols in the data communication receiver of FIG. 1 in accordance with the present invention.

Referring next to FIG. 6, a voting selector 127, which functions as another embodiment of the selector 125, is depicted according to the present invention. The voting selector 127 preferably receives an odd number of signals and preferably receives at least three signals. The voting selector 127 comprises a number of subtractors 240 equal to the number of received signals. Each subtractor 240 receives both a signal and the estimated peak and valley values, and each subtractor 240 subtracts the peak value from the received signal and the valley value from the received signal to result in two error values, e.g., a peak error value and a valley error value.

Preferably, each subtractor 240 is coupled to a symbol detector 250, which receives the peak and valley error values and which is able to determine which error value is associated with the estimated peak and which error value is associated with the estimated valley. This can be accomplished, for example, by including, for each symbol detector 250, a dedicated port for reception of the peak error value and a dedicated port for reception of the valley error value. Each symbol detector 250 thereafter determines which of the peak and valley error values is smaller. When the error value associated with the estimated peak is smaller, the symbol, e.g., one (1), corresponding to the peak is generated at the output. When the error value associated with the estimated valley is smaller, the symbol, e.g., zero (0), corresponding to the valley is generated at the output.

The symbols from each of the symbol detectors 250 are provided to a voter 270, which selects the majority symbol provided thereto. For example, when the voter 270 receives two zeros (0) and only a single one (1), the voter 270 outputs a data symbol corresponding to a zero (0).

The voting selector 127 is preferably activated each symbol time by the controller 140 so that a symbol is generated from a selected signal each symbol time. Therefore, the controller 140 of the data communication receiver 110 can recover information included in the received signals relatively accurately in comparison to recovery methods utilized by conventional data receivers. The voting selector 127 is particularly accurate for use when the signal-to-noise ratio (SNR) is high.

Figure 7:
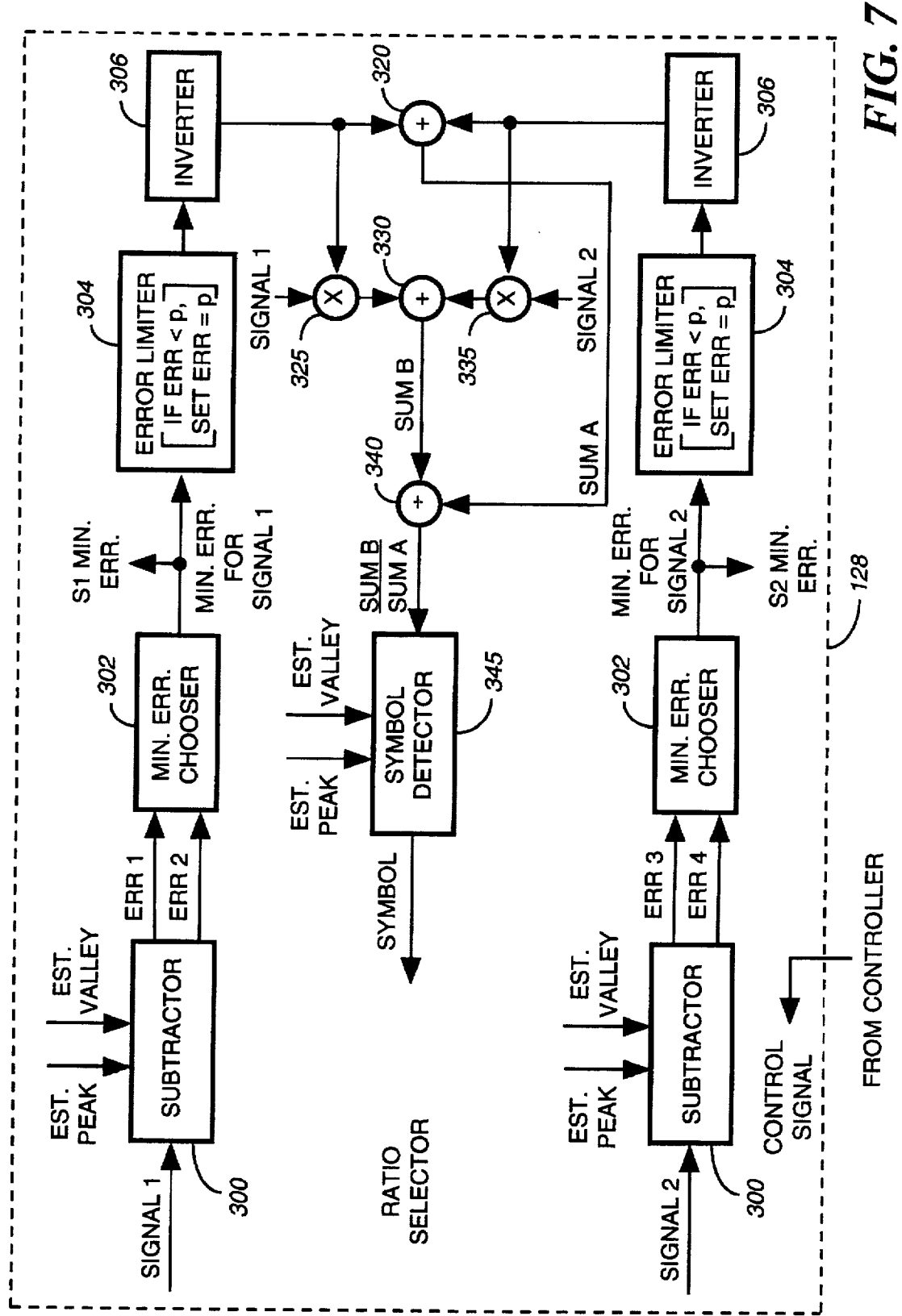
FIG. 7 is an electrical block diagram of a ratio selector circuit for selecting symbols in the data communication receiver of FIG. 1 in accordance with the present invention.

FIG. 7 is an illustration of a ratio selector 128 that can be utilized as the selector 125 (FIG. 2) in accordance with the present invention. The ratio selector 128 includes n subtractors 300, each coupled to one of n received signals. For example purposes only, two received signals and two subtractors 300 are depicted. Each subtractor 300 receives the estimated peak and valley values and a received signal. The subtractor 300 subtracts the peak and valley values, respectively, from the received signal to generate two error values, which are provided to a minimum error chooser 302 for selecting the minimum of the two provided error values. The minimum error value for each signal is then provided to an error limiter 304. Each error limiter 304 preferably limits the error value to a predetermined value p. The predetermined value p can be, for example, set to 0.001.

The error limiter output, e.g., either the minimum error or the predetermined value p, is provided to an inverter 306. The purpose of the predetermined value p is to prevent the denominator of the inverted minimum error value from being equal to zero. It will be appreciated that, when n signals are received, n minimum error choosers 302, error limiters 304, and inverters 306 are included in the ratio selector 128.

The ratio selector 128 further includes an adder 320 for receiving inverted minimum error values from each inverter 306 included in the ratio selector 128 and adding the inverted minimum error values to generate a sum, referred to as sumA. Additionally, the inverted minimum error values are provided to separate multipliers 325, 335. Each multiplier 325, 335 is coupled to the output of an inverter 306 and is also coupled to one of the received signals. For instance, a first multiplier 325 receives the first signal and also receives the inverted minimum error value associated with the first signal. The two values are then multiplied. The outputs of the multipliers 325, 335 are provided to a second adder 330, which adds all of the multiplied values to generate another sum, referred to as sumB. The two sums, i.e., sumA and sumB, are provided to a divider 340 that generates a divided value, sumB/sumA. For n received signals, the divided value is given by the following formula:

$$\text{divided value} = \frac{S_1\left[\frac{1}{min.errs_1}\right] + S_2\left[\frac{1}{min.errs_2}\right] + \ldots + S_n\left[\frac{1}{min.errs_n}\right]}{\left[\frac{1}{min.errs_1}\right] + \left[\frac{1}{min.errs_2}\right] + \ldots + \left[\frac{1}{min.errs_n}\right]} \quad (3)$$

where S represents a received signal and min.err represents the minimum of the two error values generated by the subtractor 300 for the received signal.

A symbol detector 345 is coupled to the divider 340. The symbol detector 345 determines whether the divided value received thereby is closer to the estimated peak value or to the estimated valley value. When the divided value is closer to the estimated peak value, the data symbol corresponding to the peak value is output by the symbol detector 345. When, conversely, the divided value is closer to the estimated valley value, the data symbol corresponding to the valley value is output by the symbol detector 345. The ratio selector 128 performs relatively accurately with signals having a low SNR.

As mentioned above, the peak and valley values can be estimated using any conventional method. Alternatively, the peak and valley values could be estimated by the peak and valley circuit 130 from the signal provided to the symbol detector 345. In other words, the value sumB/sumA could be provided to the peak and valley circuit 130 for computing the estimated peaks and valleys each symbol time.

Figure 8:
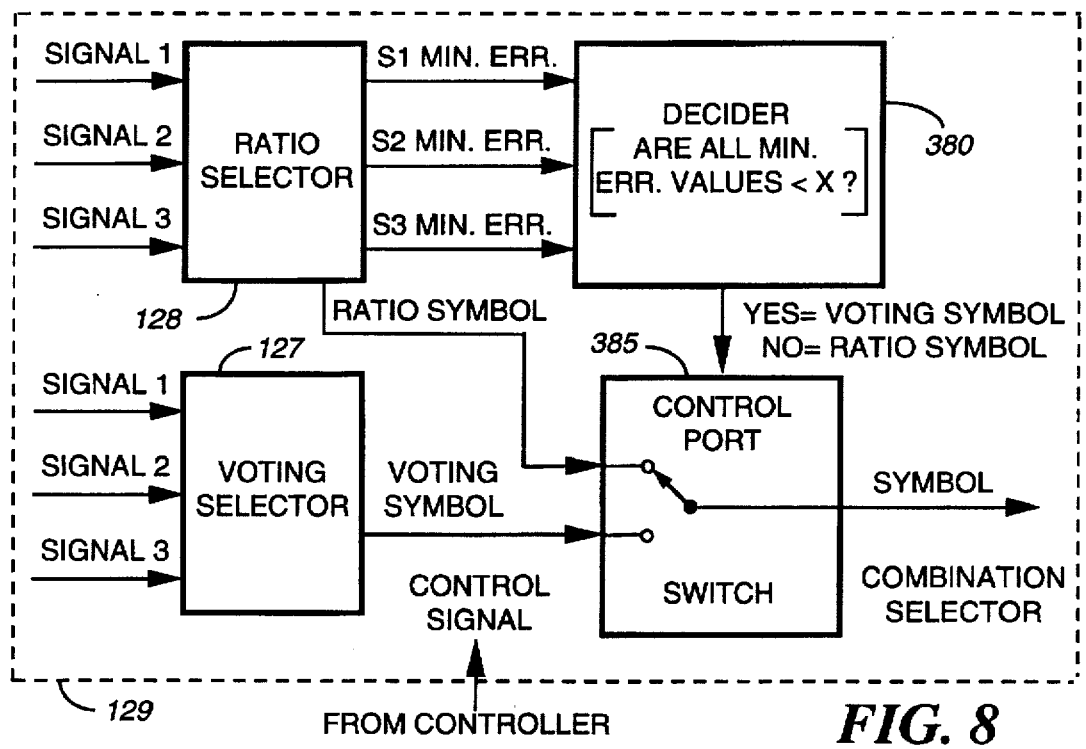
FIG. 8 is an electrical block diagram of a combination selector circuit for selecting symbols in the data communication receiver of FIG. 1 in accordance with the present invention.

FIG. 8 is a diagram of a combination selector 129 that can be used as the selector 125 (FIG. 2). The combination selector 129 includes both a voting selector 127 and a ratio selector 128. Therefore, the combination selector 129 is preferably used when an odd number of signals is received and when three or more signals are received. The data symbol outputs of the voting selector 127 and the ratio selector 128 are both provided to inputs of a switch 385.

According to the present invention, the outputs of the minimum error choosers 302 (FIG. 7) included in the ratio selector 128 are provided to a decider 380. The decider 380 determines whether all of the minimum error values are less than a predetermined number x. This predetermined number x can be, for example, programmed in software or hardwired, when hardwired logic is utilized. When all minimum error values are less than the predetermined number x, the decider 380 generates a signal indicating to the switch 385 that the data symbol from the voting selector 127 is to be utilized. Otherwise, the decider 380 generates a signal indicating that the data symbol From the ratio selector is to be used. The selected data symbol is then provided to the controller 140.

By way of example, the predetermined number x can be given by the following formula:

$$x = \frac{\text{est. peak} - \text{est. valley}}{4}.$$

The above formula, though, is given for example purposes only. It will be appreciated that the value of x can be chosen depending upon various factors, such as the type of signalling system and hardware considerations.

The estimated peak and valley values for the combination selector 129 could be, for instance, determined by tracking the signal from which the selected symbol is derived. For example, when the chosen data symbol comes from the first signal provided to the voting selector 127, the first signal could then be fed back to the peak and valley circuit 130 for estimation of further peak and valley values.

The use of the combination selector 129 gives relatively accurate performance regardless of the SNR. The ratio selector 128 is advantageously chosen for use when the SNR is low. When, conversely, the SNR is high, the voting selector 127 is employed. Therefore, the data symbol provided to the controller 140 is not only chosen from one of several received radio signals, but also is determined by one of two different selectors 135, 140 depending upon the SNR. As a result, the data symbol for each symbol time is more likely to be correct than is the case in for the voting selector 127, the ratio selector 128, or prior art data receivers. It is therefore less likely that the data communication receiver 110 will miss or erroneously recover information.

Figure 9:
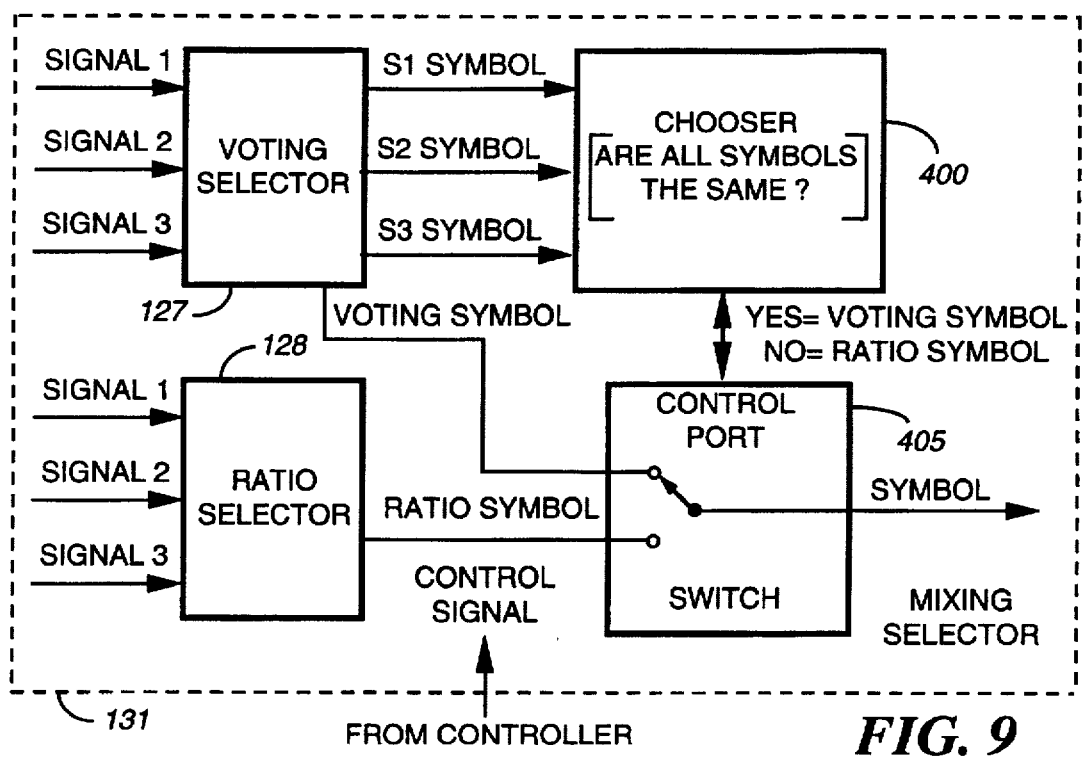
FIG. 9 is an electrical block diagram of a mixing selector circuit for selecting symbols in the data communication receiver of FIG. 1 in accordance with the present invention.

FIG. 9 depicts a mixing selector 131 which comprises a voting selector 127 and a ratio selector 128. The mixing selector 131, like the combination selector 129, is preferably utilized when an odd number of signals, greater than two, is received. The data symbol outputs of the voting selector 127 and the ratio selector 129 are both provided to inputs of a switch 405.

According to the present invention, the outputs of the symbol detectors 250 (FIG. 6) of the voting selector 127 are provided to a chooser 400. The chooser 400 determines whether all of the symbols are the same. When so, the chooser 400 instructs the switch 405 to utilizes the voting symbol. When the symbol detector outputs are not all the same, the chooser 400 instructs the switch 405 to provide the ratio symbol at its output. In this manner, when there is a relatively high probability that the symbol selection by the voting selector 127 is correct, i.e., when all symbols are the same, the symbols selected by the voting selector 127 is provided to the controller 140 (FIG. 2). Otherwise, the symbol selected by the ratio selector 128 is provided to the controller 140.

The voting selector 127, the ratio selector 128, the combination selector 129, and the mixing selector 131 are preferably implemented in software, such as in a digital signal processor (not shown). However, hardwired logic capable of performing equivalent operations can be alternatively used.

Figure 10:
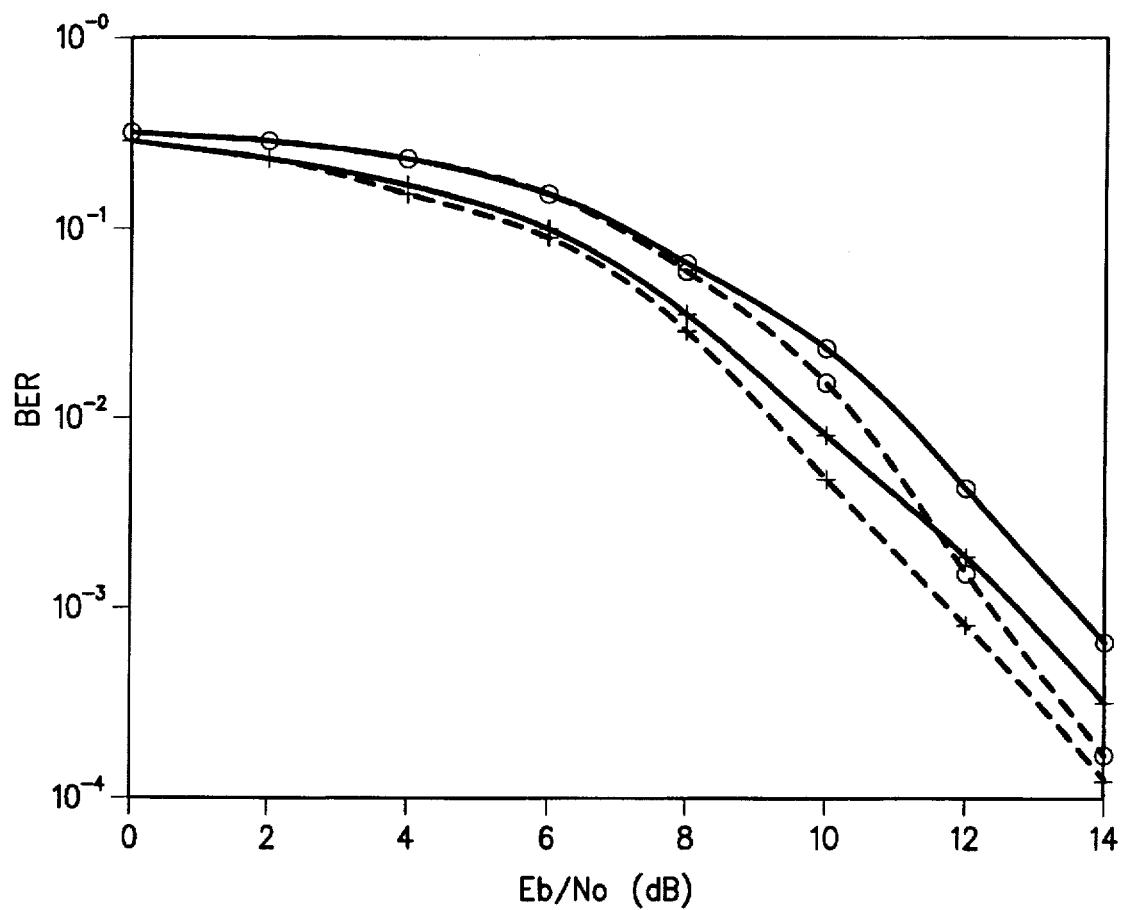
FIGS. 10–15 are graphs depicting the performance of a prior art receiver compared to the respective performances of the branch selector of FIG. 5, the voting selector of FIG. 6, and the ratio selector of FIG. 7 in static and Rayleigh fading channels.
Figure 11:
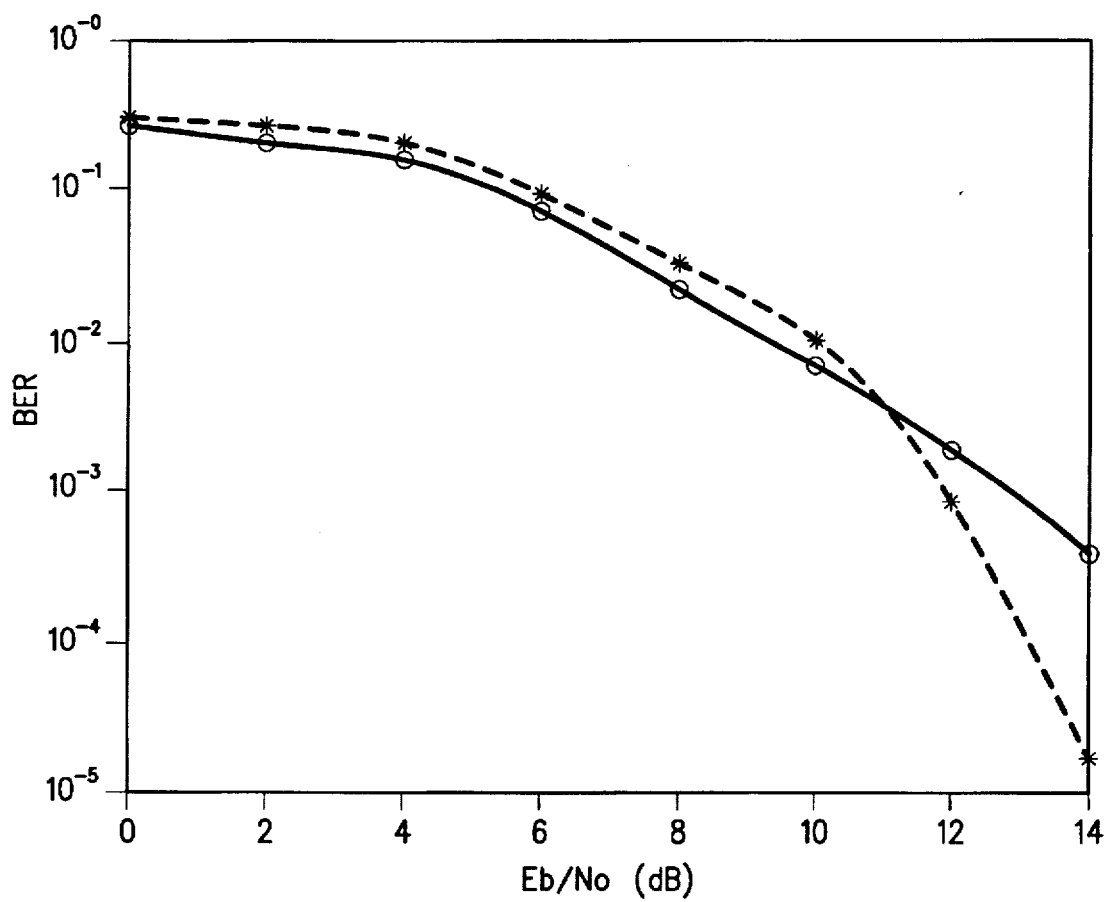
Figure 12:
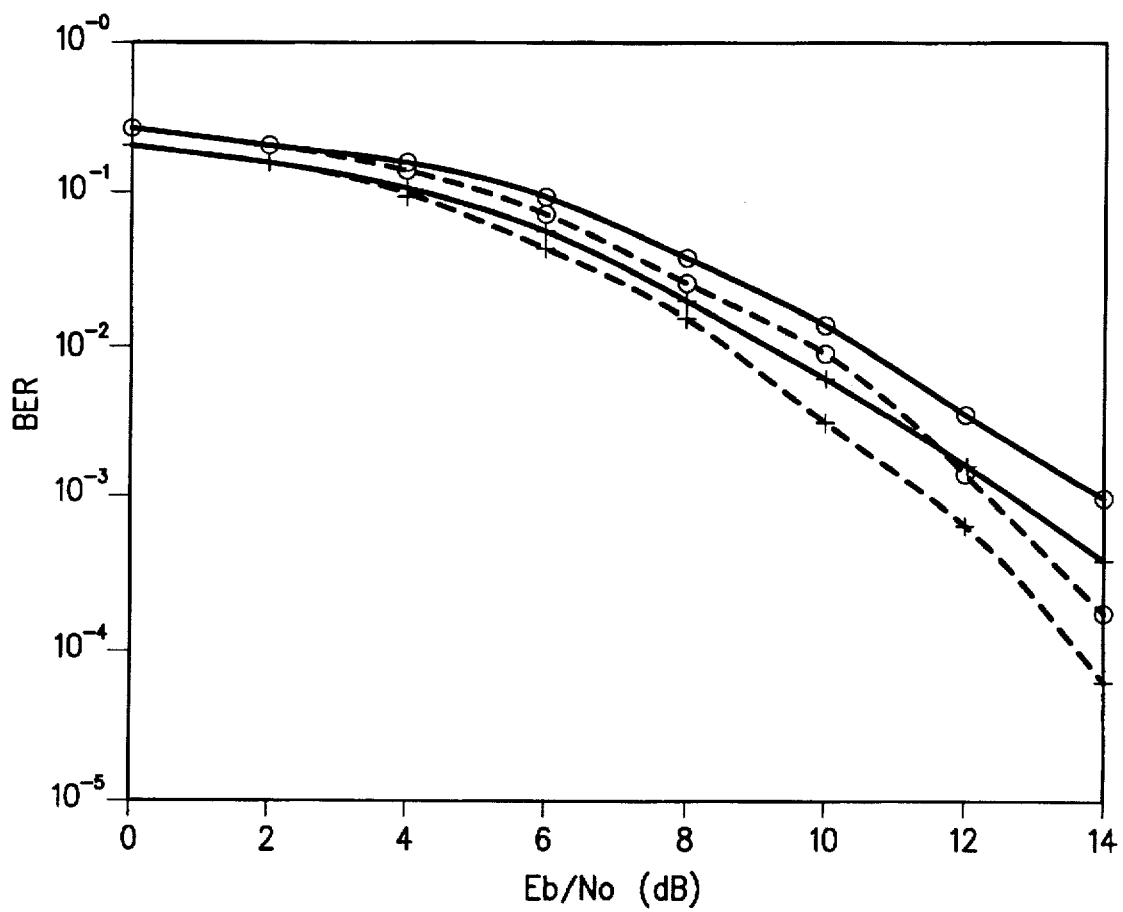

FIGS. 10–12 are graphs illustrating the performance of a prior art diversity receiver compared to the performance of a receiver utilizing a branch selector 126 (FIG. 10), a voting selector 127 (FIG. 11), and a ratio selector 128 (FIG. 12) in a static channel. The performance of the prior art receiver is depicted in FIGS. 10–12 by the solid lines, while the performance of the receiver according to the present invention is depicted by the dashed lines. The y-axis represents "bit error rate", and the x-axis represents receiver sensitivity in decibels. Additionally, in the graphs on which more than two lines are drawn, the lines marked with "+" indicate three incoming signals, while lines marked with "o" indicate two incoming signals.

Figure 13:
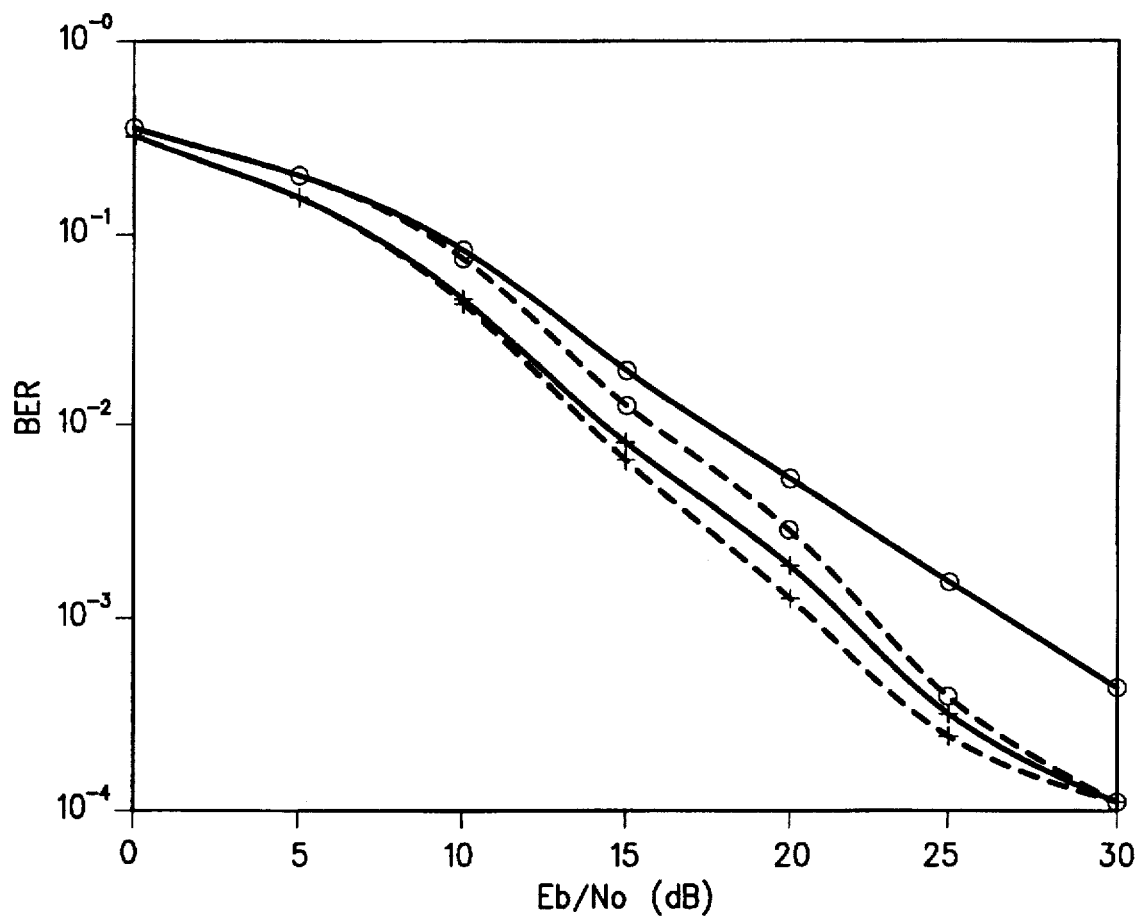
Figure 14:
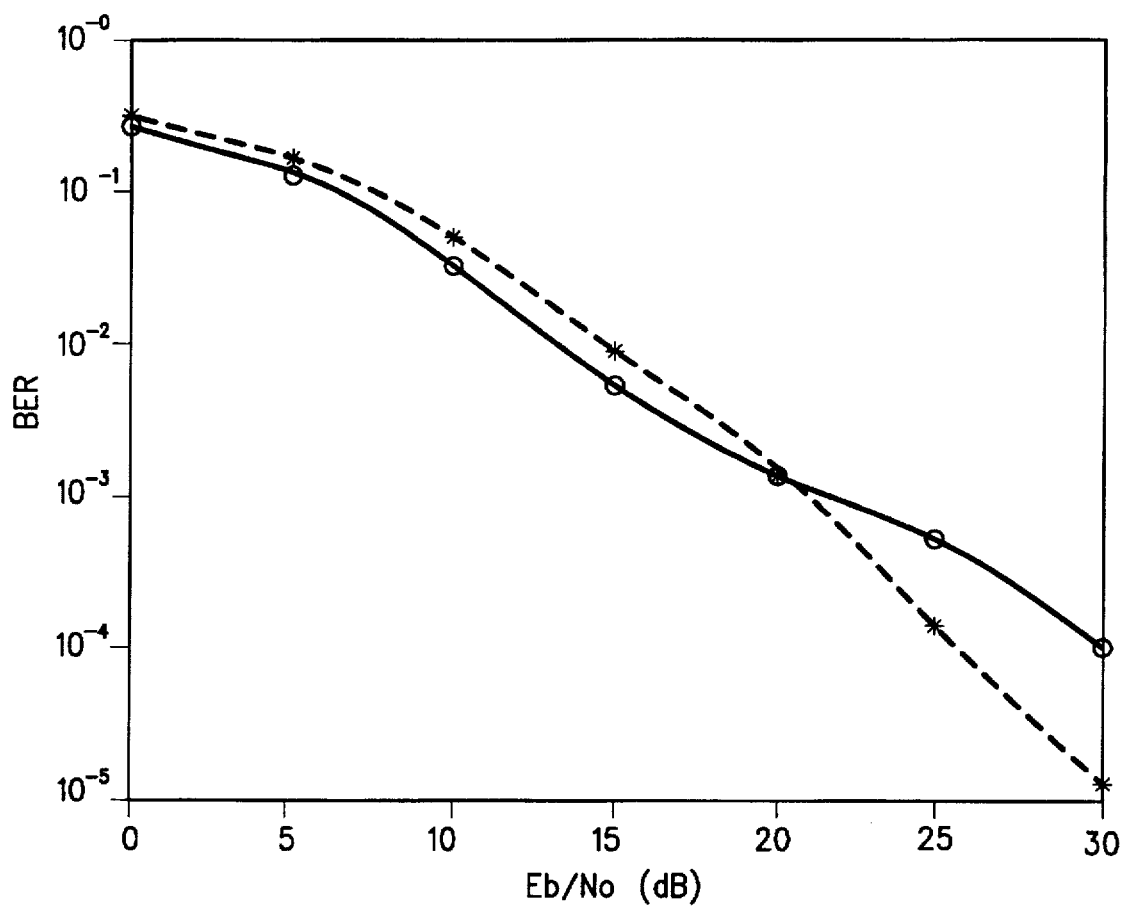
Figure 15:
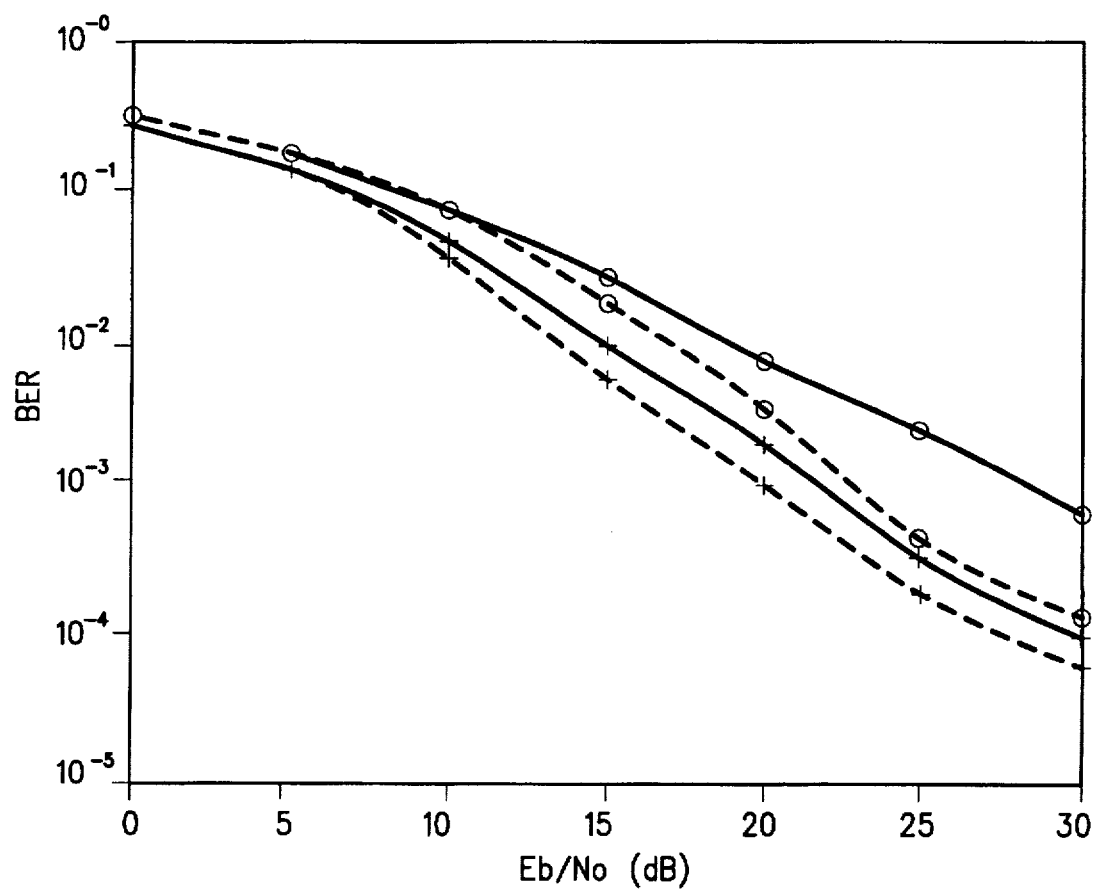

FIGS. 13–15 are graphs illustrating the performance of a prior art diversity receiver compared to the performance of a receiver utilizing a branch selector 126 (FIG. 13), a voting selector 127 (FIG. 14), and a ratio selector 128 (FIG. 15) in a Rayleigh fading channel. The performance of the prior art receiver is depicted in FIGS. 13–15 by the solid lines, while the performance of the receiver according to the present invention is depicted by the dashed lines. The y-axis represents "bit error rate", and the x-axis represents receiver sensitivity in decibels. Additionally, in the graphs on which more than two lines are drawn, the lines marked with "+" indicate three incoming signals, while lines marked with "o" indicate two incoming signals.

As can be seen from FIGS. 10-15, the receiver according to the present invention performs more accurately than the prior art receiver in both static and Rayleigh fading channels. As a result, the user of a receiver according to the present invention is more likely to receive messages correctly and less likely to miss messages.

Figure 16:
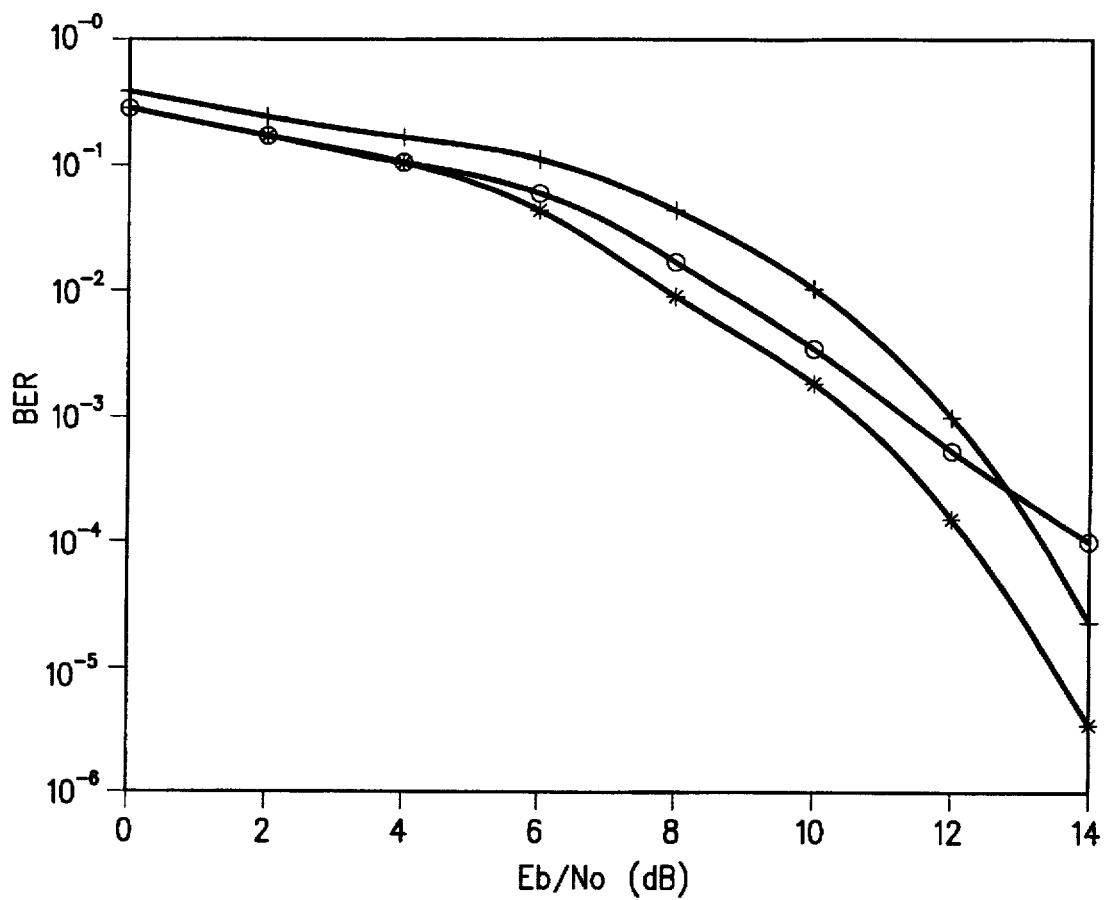
FIGS. 16 and 17 are graphs illustrating the performances of the voting selector of FIG. 6, the ratio selector of FIG. 7, and the combination selector of FIG. 8.
Figure 17:
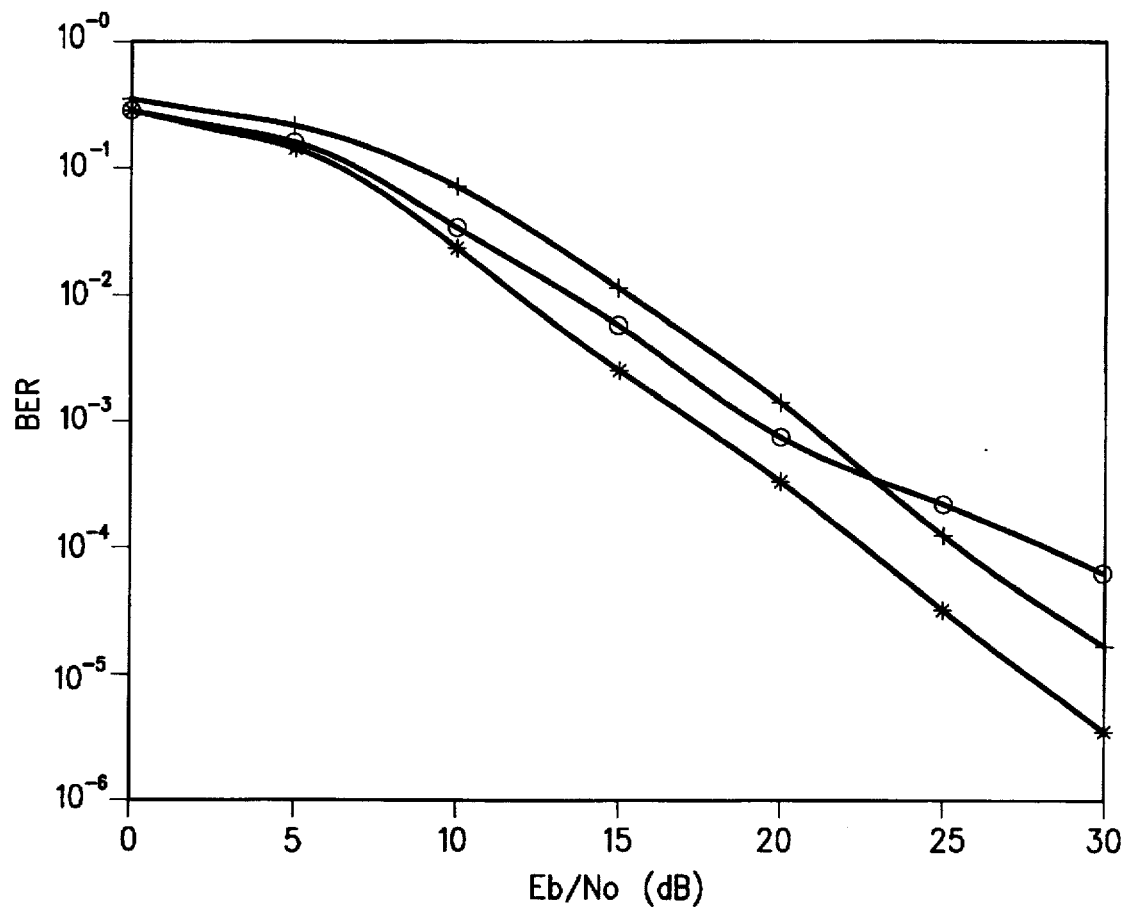

FIGS. 16 and 17 are graphs comparing the performance of the combination selector 129 (FIG. 8), indicated by the line marked with "x", with the voting selector 127 (FIG. 6), indicated by the line marked with "+", and the ratio selector 128 (FIG. 7), indicated by the line marked with "o", for static and Rayleigh fading channels. As can be seen, the combination selector 129 performs better than the voting and ratio selectors 127, 128 at both high and low signal-to-noise ratios.

In summary, the data communication receiver 110 processes multiple signals in which the same information is transmitted. The selector 125 is activated to sample the signals once every symbol time, and, once every symbol time, the selector 125 makes a symbol decision. The resulting data symbol is chosen from the received signal having the minimum error during that symbol time. Because the signal from which the data symbol is recovered can change each symbol time, erroneous data symbols are less likely to be generated than in some prior art receivers that do not make a symbol choice from different signals each symbol time. Therefore, the user can be provided with accurate information, and messages are not missed.

Furthermore, the data communication receiver 110 does not use an indication of received signal strength to choose a signal from which the symbol will be selected. Instead, according to the present invention, the data symbol selection is based upon minimum error values determined for each signal based upon estimated peak and valley values. As a result, the symbol selection can occur digitally in the receiver back-end so that less complicated circuitry can be used.

The use of the combination selector 129 is also advantageous because the data symbol selection is optimized, according to the present invention, for the signal-to-noise ratio. Specifically, when the signal-to-noise ratio is high, the symbol selected by the voting selector 127 is used while, when the signal-to-noise ratio is low, the symbol selected by the ratio selector 128 is used. Therefore, regardless of the signal-to-noise ratio, the best possible determination of the data symbol is made.

It will be appreciated by now that there has been provided a method and apparatus for more reliably detecting data symbols in a diversity communication system.

What is claimed is:

1. A method for selecting a data symbol from received signals in a data receiver including a receiving circuit for receiving signals comprising data symbols and a controller for decoding the data symbols, the method comprising the steps of:

receiving first, second, and third signals;

comparing the first, second, and third signals with estimated peak and valley values;

generating, in response to the comparing step, error values associated with the first, second, and third signals;

selecting a first data symbol from the first signal based upon error values associated with the first signal;

selecting a second data symbol from the second signal based upon error values associated with the second signal;

selecting a third data symbol from the third signal based upon error values associated with the third signal;

determining which data symbol is represented by a majority of the first, second, and third data symbols to result in a selected symbol; and processing the selected symbol.

2. The method of claim 1, further comprising the steps of:

processing other selected symbols;

recovering information intended for reception by the data receiver from the selected symbol and the other selected symbols; and presenting the information to a user of the data receiver.

3. A method for selecting a data symbol from received signals in a data receiver including a receiving circuit for receiving signals comprising data symbols and a controller for decoding the data symbols, the method comprising the steps of:

receiving at least first and second signals;

comparing the at least first and second signals with estimated peak and valley values;

generating, in response to the comparing step, error values associated with the at least first and second signals;

determining minimum error values, each associated with a signal included in the at least first and second signals;

inverting the minimum error values to result in inverted minimum error values;

adding the inverted minimum error values to result in a first sum;

multiplying each of the inverted minimum error values by a signal associated therewith to generate multiplied values;

adding the multiplied values to result in a second sum;

dividing the second sum by the first sum to result in a divided value;

selecting a data symbol in accordance with the divided value to generate a selected symbol; and processing the selected symbol.

4. The method of claim 3, further comprising the steps of:

processing other selected symbols;

recovering information intended for reception by the data receiver from the selected symbol and the other selected symbols; and presenting the information to a user of the data receiver.

5. A data receiver for processing multiple signals, the data receiver including:

a receiving circuit for demodulating at least first and second signals;

a ratio selector including:

subtractors for generating error values associated with the at least first and second signals;

determining means for determining minimum error values from the error values;

inverters for inverting the minimum error values to generate inverted values;

a first adder for adding the inverted values to generate a first sum;

multipliers for multiplying the inverted values with signals associated therewith to generate multiplied values;

a second adder for adding the multiplied values to generate a second sum;

a divider coupled to the first and second adders for dividing the second sum by the first sum to generate a single value; and a symbol detector for generating a data symbol in accordance with the single value and estimated peak and valley values;

timing means for activating the ratio selector at predetermined times; and a controller coupled to the ratio selector and the timing means for recovering information in accordance with the data symbol.

6. The data receiver of claim 5, further comprising:

a memory coupled to the controller for storing the information; and a presentation device coupled to the controller for presenting the information to a user.

7. A data receiver for processing multiple signals, the data receiver including:

a receiving circuit for demodulating first, second, and third signals;

a selector comprising:
subtractors for generating error values associated with the first, second, and third signals;
symbol detectors, each coupled to a subtractor, for generating at least first, second, and third symbols in accordance with the error values and the estimated peak and valley values; and
a voter coupled to the symbol detectors for selecting a data symbol represented by a majority of the at least first, second, and third symbols;

timing means for activating the selector at predetermined times; and a controller coupled to the selector and the timing means for recovering information in accordance with the data symbol.

8. The data receiver of claim 7, further comprising:

a memory coupled to the controller for storing the information; and a presentation device coupled to the controller for presenting the information to a user.

9. A data receiver for processing multiple signals, the data receiver including:

a receiving circuit for demodulating at least first, second, and third signals;

a selector for comparing the at least first, second, and third signals to estimated peak and valley values, for generating error values associated with the at least first, second, and third signals, and for selecting a data symbol associated with one of the estimated peak and valley values based on the error values, the selector including a voting selector for generating a first symbol; a ratio selector for generating a second symbol; and deciding means for selecting between the first and second symbols to generate the data symbol;

timing means for activating the selector at predetermined times; and a controller coupled to the selector and the timing means for recovering information in accordance with the data symbol.

10. The data receiver of claim 9, wherein the voting selector includes:

first subtractors for generating a first set of error values associated with the at least first, second, and third signals;

symbol detectors, each coupled to one of the first subtractors, for generating at least first, second, and third intermediate symbols in accordance with the first set of error values and the estimated peak and valley values; and a voter coupled to the symbol detectors for selecting the first symbol by choosing a symbol represented by a majority of the at least first, second, and third intermediate symbols.

11. The data receiver of claim 10, wherein the ratio selector includes:

second subtractors for generating a second set of error values associated with the at least first, second, and third signals;

determining means coupled to the second subtractors for determining minimum error values from the second set of error values;

inverters coupled to the determining means for inverting the minimum error values to generate inverted values;

processing means coupled to the inverters for generating a single value from the inverted values; and symbol detecting means coupled to the processing means for generating the second symbol in accordance with the single value and the estimated peak and valley values.

12. The data receiver of claim 11, wherein the processing means comprises:

a first adder for adding the inverted values to generate a first sum;

multipliers for multiplying the inverted values with signals associated therewith to generate multiplied values;

a second adder for adding the multiplied values to generate a second sum; and a divider coupled to the first and second adders for dividing the second sum by the first sum to generate the single value.

13. The data receiver of claim 12, wherein the deciding means comprises:

a decider coupled to the determining means for generating a first indication when all of the minimum error values are less than a predetermined number and for generating a second indication when all of the minimum error values are not less than the predetermined number; and a switch coupled to the decider for selecting the first symbol for use as the data symbol when the first indication is received and for selecting the second symbol for use as the data symbol when the second indication is received.

* * * * *